March 18, 1952   E. H. ROEBEN   2,589,435
FISHHOOK GUARD
Filed Dec. 23, 1946
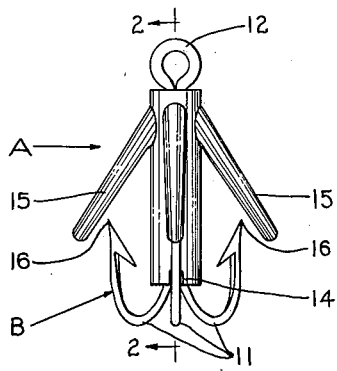
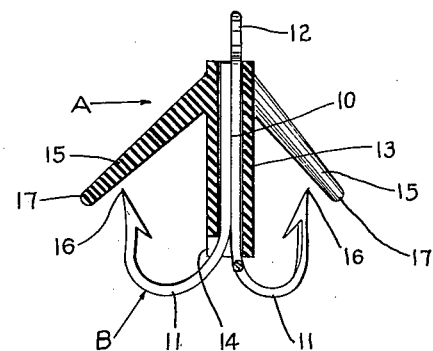
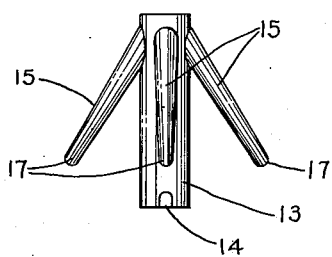
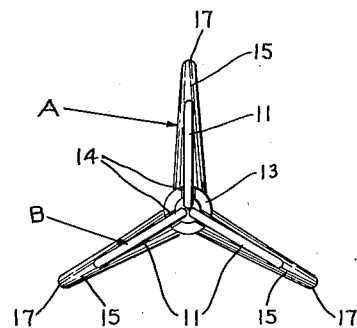
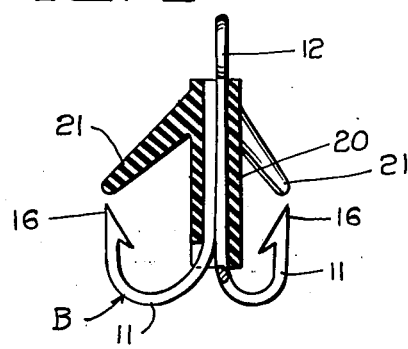
Inventor
ERNEST H. ROEBEN
By Robert M. Dunning
Attorney Patented Mar. 18, 1952

2,589,435

UNITED STATES PATENT OFFICE 2,589,435

FISHHOOK GUARD

Ernest H. Roeben, St. Paul, Minn.

Application December 23, 1946, Serial No. 717,959

2 Claims. (Cl. 43—42.1)

My invention relates to an improvement in fish hook guard wherein it is desired to prevent the fish hook from becoming entangled in weeds and the like.

Numerous types of guards have been provided for the purpose of rendering hooks weedless. While most of these guards are formed of wire or similar material, certain guards have been provided of other resilient materials such as rubber and the like. Most of these previous constructions have certain disadvantages. In the first place there is no simple means provided for attaching the guard to the hook. In the second place most previous guards are provided with no means of holding the guard from rotation about the hook, thus making it possible for the guard to rotate out of operative position. Furthermore many of the guards previously formed of rubber provide guard arms which are rectangular in cross section and which therefor have a tendency to catch on the points of the hooks as the guards are flexed inwardly towards these points.

An object of the present invention is to provide a fish hook guard which will obviate most of the previous difficulty experienced with such guards. My guard may be easily and quickly attached to the hook, preferably by forming the guard body of material sufficiently resilient and flexible to pass over the eye of the hook. Accordingly my guard may be attached to the shank of a hook in a simple and efficient manner.

A feature of the present invention resides in the provision of a guard particularly designed for use in combination with a triple hook having three hooks arranged in equally spaced angular relationship. My guard is provided with a tubular body portion designed to overlie the shank of the hook. This body portion is formed of material sufficiently resilient to pass over the eye of the hook to simplify the attachment of the guard to any hook of the type described.

A feature of the present invention resides in the provision of a fish hook guard which is provided with a tubular body having notches in one end thereof, these notches being positioned in angularly spaced relationship. For example on the triple hook above described the notches are arranged one hundred twenty degrees apart and are designed to engage on opposite sides of the bent portion of the hook to hold the body of the guard from rotation relative to the hook shank.

An added feature of the present invention resides in the provision of resilient fingers secured to the tubular body and extending outwardly and rearwardly to overlie the pointed ends of the hooks. Each such finger is designed to overlie the pointed end of an individual hook. Furthermore each finger is circular in cross section so that in the event the guard is flexed toward the shank of the hook as would be the case if a fish took the bait, the guard finger would roll to one side or the other of the point and would not engage into the pointed hook end.

These and other objects and novel features of my invention will be more clearly and fully set forth in the following specification and claims.

In the drawings forming a part of my specification:

Figure 1 is a side elevational view of my guard in position on the hook showing the construction of the guard.

Figure 2 is a cross sectional view through the body of the guard and through one of the fingers attached thereto.

Figure 3 is an end view of the hook showing the relationship between the guard arms and the hooks.

Figure 4 is a side elevation view of the guard removed from the hook.

Figure 5 is a view similar to Figure 2 showing guards of a shorter type.

The fish lure guard A is preferably designed for attachment with the triple hook B. The triple hook B is usually formed with a shank portion 10 and three curved hook portions 11 on one end thereof. The curved hook portions 11 are spaced angularly one hundred twenty degrees apart, as indicated in Figure 3 of the drawings. An eye 12 is provided on the end of the shank 10 by means of which the triple hook may be attached to a fish lure or the like. The guard A includes an elongated tubular body 13 designed to enclose the hook shank 10 and this body 13 is provided with notches 14 in one end thereof to accommodate the curved portions 11 of the hook B. In other words, one curved portion 11 of the hook extends through each slot 14, the slots being of proper size and width to accommodate the hook.

A series of angularly spaced fingers 15 are secured to the body 13 near the end of the body opposite the notched end. These fingers 15 are angularly spaced similarly to the curved portion 11 of the hook B and are designed to extend beyond the pointed ends 16 of the hooks. The arms 15 are tapered in construction, being somewhat thicker at their base than at their free ends 17. Thus the arms increase in flexibility with an increase in distance from their point of attachment to the tubular body 13.

The arms 15 are preferably circular in cross-section. As a result when the arms are compressed together, they are guided to one side or the other of the pointed ends 16 of the hook B. This circular cross section has been found to be an important feature of my invention. When arms such as 15 are formed which are rectangular in cross-section, the base or undersurface of the arms has a tendency to catch against the point of the hook, thus embedding the hook in the arm. A fish biting the hook will thus flex the arms 15 past the pointed ends 16 of the hook so that the hook ends can readily engage the mouth of the fish.

In applying my guard to a hook, it is only necessary to insert the eye 12 in the notched end of the body 13, forcing the eye of the hook through the tubular body until the notches 14 engage in the curved ends 11 of the hook. The opposite end of the body 13 engages beneath the eye 12 in preferred form, holding the body from longitudinal movement. The notches 14 hold the body 13 from rotative movement, thus holding the fingers 15 in proper relation to the pointed ends of the hook.

The guard illustrated in Figure 5 of the drawings differs slightly from that shown in the remaining figure in the length of the guard arms producing the forward ends of the hook. The guard shown in Figure 5 includes a tubular, flexible, resilient body 20 similar to the tubular body 13 of the previously described guard and having notches at its outlet end through which the hook may extend. Guard arms 21 extend outwardly from the unnotched end of the body 20, these arms 21 extending into proximity with the pointed ends 16 of the hooks 11. This type of construction has the advantage that they will not be contacted by the mouth of the fish prior to the time the hooks are engaged. However, this construction has the disadvantage that the arms do not protect the hook as well as the longer arms.

It will be noted that in both constructions the arms overlie the pointed ends of the hooks.

In accordance with the patent statutes, I have described the principles of construction and operation of my fish hook guard, and while I have endeavored to set forth the best embodiment thereof, I desire to have it understood that obvious changes may be made within the scope of the following claims without departing from the spirit of my invention.

I claim:

1. A guard for a fish hook having a shank and a curved end including a tubular resilient body designed to engage the shank of the hook, said tubular body having a notch in one end thereof, said notch being designed to accommodate the curved end of the hook, and arm means secured to said body and extending at an acute angle thereto, said arm extending into position to overlie the pointed end of the hook.

2. A guard for a triple hook having a shank and curved ends including a tubular resilient body enclosing the shank of the hook, said tubular body having a series of angularly spaced notches in one end thereof, said notches being adapted to receive the curved ends of the triple hook, and resilient arm means on said body and extending into position to overlie the pointed ends of the hook.

ERNEST H. ROEBEN.

REFERENCES CITED

The following references are of record in the file of this patent:

UNITED STATES PATENTS

| Number | Name | Date |
| --- | --- | --- |
| 539,149 | Shattuck | May 14, 1895 |
| 1,419,903 | Bailey | June 13, 1922 |
| 1,768,033 | Deatz | June 24, 1930 |
| 2,112,180 | Stoddard | Mar. 22, 1938 |